O. J. PAGE.
COOKING UTENSIL.
APPLICATION FILED MAY 26, 1915.
1,176,239.
Patented Mar. 21, 1916.
2 SHEETS—SHEET 1.
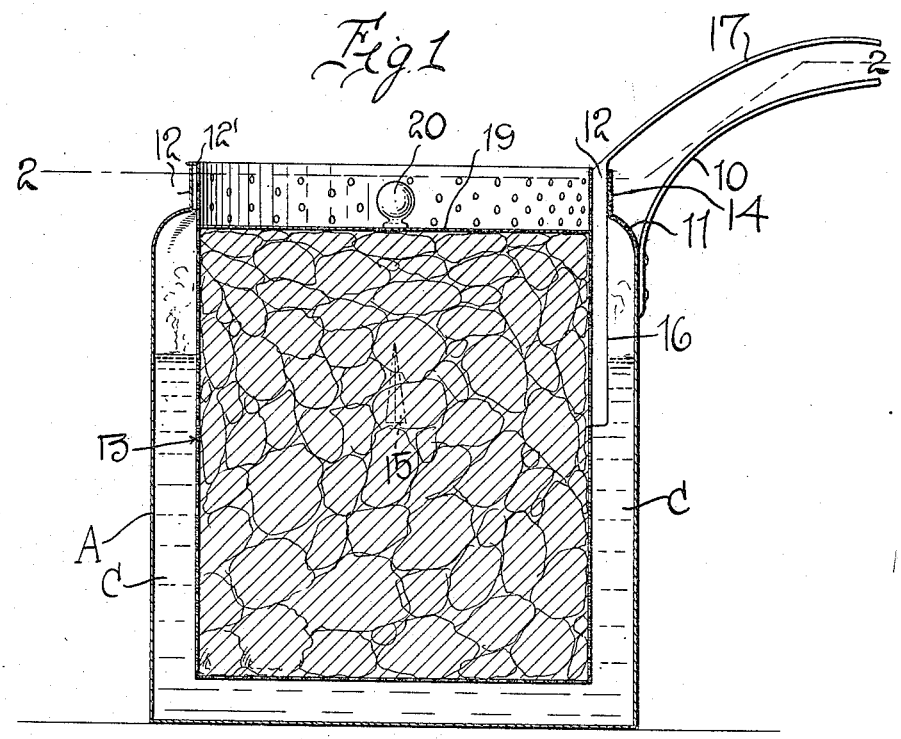
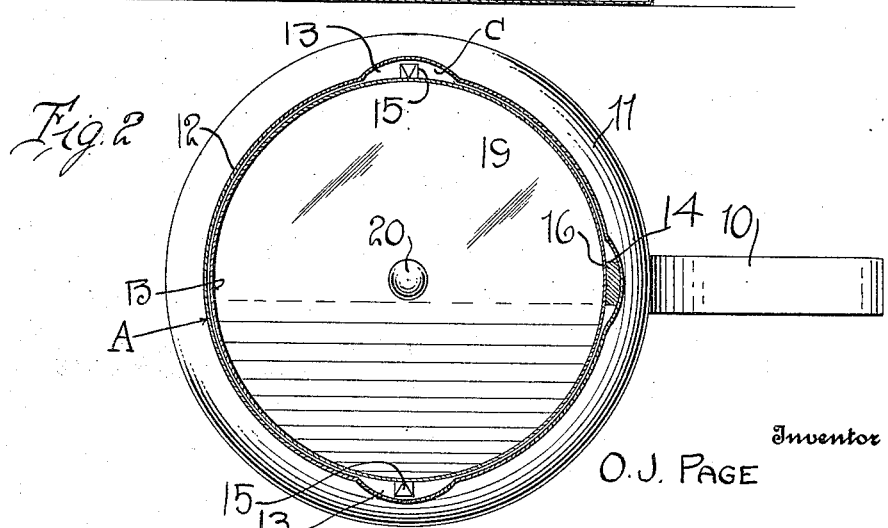
Inventor
O. J. Page
By Watson E. Coleman
Attorney O. J. PAGE.
COOKING UTENSIL.
APPLICATION FILED MAY 26, 1915.
1,176,239.
Patented Mar. 21, 1916.
2 SHEETS—SHEET 2.
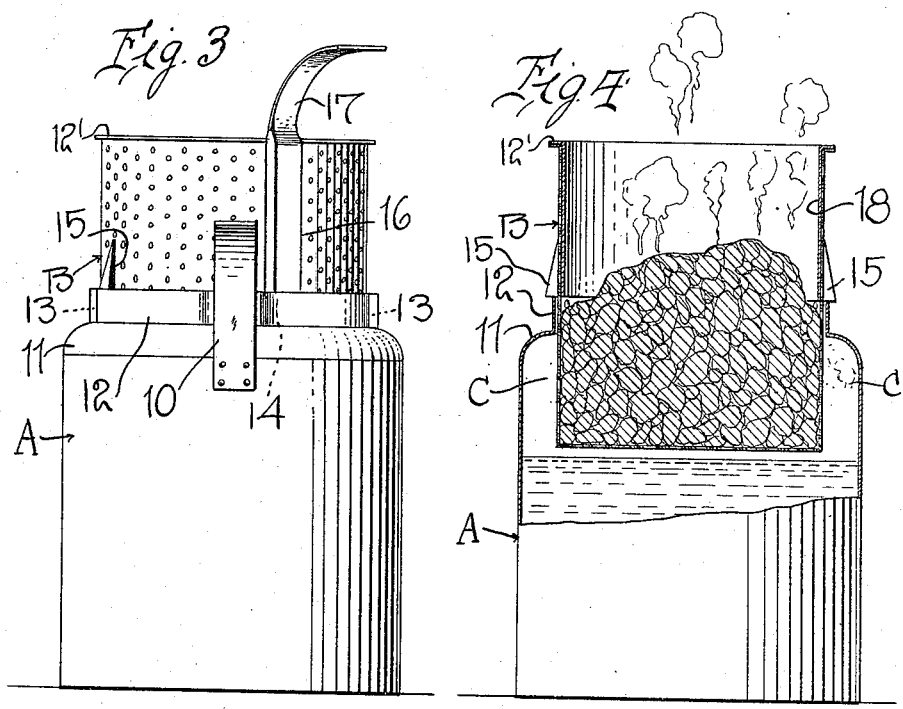
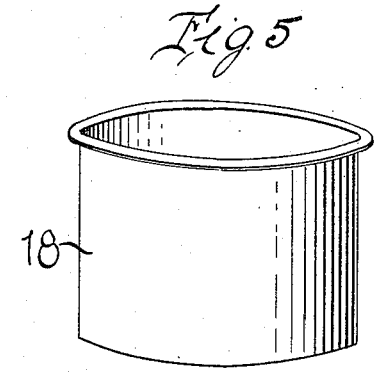
Inventor
O. J. PAGE
By Watson E. Coleman
Attorney
THE COLUMBIA PLANOGRAPH CO., WASHINGTON, D. C.

UNITED STATES PATENT OFFICE.

OSWALD J. PAGE, OF RICHMOND, CALIFORNIA.

COOKING UTENSIL.

1,176,239.                    Specification of Letters Patent.       Patented Mar. 21, 1916.

Application filed May 26, 1915.   Serial No. 30,621.

*To all whom it may concern:*

Be it known that I, OSWALD J. PAGE, a citizen of the United States, residing at Richmond, in the county of Contra Costa and State of California, have invented certain new and useful Improvements in Cooking Utensils, of which the following is a specification, reference being had to the accompanying drawings.

My present invention relates to new and useful improvements in cooking utensils and has particular reference to those of the class known as double boilers.

The primary object of the invention is to provide a utensil of the character above specified which is relatively simple in construction and may, therefore, be cheaply manufactured and one in which the inner receptacle may be partially lifted from the outer receptacle for inspection of the cooking food, without the loss of any material amount of heat from the cooking food.

A further object of my invention is to so construct the outer receptacle that the inner receptacle may be partially lifted therefrom and then given a partial turn so as to bring the supporting lugs, which it carries, to bear upon the upper edge of the outer receptacle, whereby the inner receptacle will be supported in partially withdrawn position for inspection of the cooking food.

Another important object of the invention is to provide a cooking utensil in which the inner receptacle, wherein the food is contained, may be completely withdrawn from the water and supported in partially withdrawn position from the outer receptacle, so that the water may be drained from the food back into the outer receptacle and the food is then allowed to rest where it will be subjected to the heat of the hot water in the outer receptacle, until it is desired to serve the food.

It is also an object of the present invention to provide a cooking utensil in which the inner receptacle is provided with a perforated bottom which does not quite reach the bottom of the outer receptacle so that the contents of the inner receptacle are prevented from burning on the bottom.

The above and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention as it is reduced to practice, and throughout the several views of which similar reference numerals designate corresponding parts, Figure 1 is a vertical section taken medially through the utensil in a plane comprehending the handles, these members being shown in full lines, however; Fig. 2 is a section on the line 2—2, of Fig. 1; Fig. 3 is a detail view in elevation of the utensil with the inner receptacle partially withdrawn; Fig. 4 is a vertical section showing the inner receptacle partially withdrawn, as in Fig. 3; Fig. 5 is a detail perspective view of the heat retaining annulus employed when the inner receptacle is partially withdrawn from the outer receptacle for the inspection of food.

As best shown in Fig. 3 of the accompanying drawings, the utensil consists essentially in an outer receptacle A and an inner receptacle B. The outer receptacle A is preferably cylindrical in shape and is provided with a handle which, as indicated at 10, is of conventional design. The upper end of the outer receptacle A is directed inwardly, forming a breast 11 from which rises the annular rim or flange 12. This member 12 defines an opening which is of considerably less diameter than the receptacle A, the purpose being to make provision for an annular chamber C between the inner and outer receptacles, for the accommodation of the boiling water. At diametrically opposite points, the flange 12 is directed outwardly to define the opposed channels 13. These channels 13 are provided so that the supporting legs of the inner receptacle to be hereinafter described, may pass into the outer receptacle or be withdrawn therefrom. Between the channels 13, is formed a somewhat similar channel 14 which is adapted to receive the shank of the handle and an additional supporting lug when the inner receptacle is being inserted in or removed from the outer receptacle.

The inner receptacle B is cylindrical in shape and is of a diameter slightly less than the diameter of the flange 12 so that it may be freely and easily inserted in the outer receptacle. The inner receptacle is preferably foraminated so that the food cooked therein may be quickly drained of water when the inner receptacle is to be withdrawn. The upper terminal of the inner receptacle is provided with an outwardly directed annular flange 12' which is adapted to seat upon the flange 12 of the outer receptacle and thereby support the inner receptacle with its bottom wall spaced from the bottom wall of the outer receptacle. At an approximate middle point in the side wall of the inner receptacle, are a pair of diametrically opposed, laterally extending, supporting lugs 15. The lower end of the shank 16 of the inner receptacle handle 17, provides a similar supporting lug. It will now be readily appreciated that when the inner receptacle is placed within the outer receptacle, the lugs are brought into vertical alinement with the channels so that the inner receptacle may be freely passed into the outer receptacle. Attention is directed to Fig. 1, wherein it will be seen that the shank of the handle 17 passes through the channel 14 and is of such width and length that it will prevent the turning of the inner receptacle, while the food is being cooked.

As a means for preventing the escape of an undue amount of heat from the inner receptacle when this member is partially withdrawn from the outer receptacle, for the purpose of inspecting the cooking food, I employ an annulus 18 which is formed of relatively light sheet metal and is of a height equal to one-half the depth of the inner receptacle. This band may be applied inside the receptacle, as in Fig. 4, to seal the perforations at the upper end of the inner receptacle when this member is partially withdrawn.

It will, of course, be understood that the utensil need be accompanied by the annulus 18 only when desired and that the utensil may be employed and used without this member, without departing in any way from the spirit of the invention.

As disclosed in Fig. 1, a circular plate or disk of sheet metal or any other material 19 having a handle 20 may be employed in pressing vegetables which are being cooked within the inner receptacle.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in the details of construction, proportion and arrangement of parts may be resorted to, when required, without sacrificing any of the advantages of this invention, as defined by the appended claims.

I desire to direct particular attention to the fact that the inner receptacle has a perforated bottom which may be supported above the bottom of the outer receptacle so that the contents of the inner receptacle are prevented from burning on the bottom.

What is claimed is:—

1. A cooking utensil including an outer receptacle, an inner receptacle, and supporting lugs carried by the inner receptacle, said supporting lugs being adapted for engagement with the upper edge of the outer receptacle, for supporting the inner receptacle in partially withdrawn position, one of said lugs being extended above the inner receptacle to afford an operating handle.

2. A cooking utensil including an outer receptacle, a foraminous inner receptacle, lugs engageable with the upper end of the outer receptacle for supporting the inner receptacle in partially withdrawn position, and a heat retaining annulus insertible in the upper end of the inner receptacle for sealing the openings thereof whereby the undue escape of heat from the inner receptacle when the same is partially withdrawn from the outer receptacle, will be prevented.

In testimony whereof I hereunto affix my signature in the presence of two witnesses.

OSWALD J. PAGE.

Witnesses:
 L. L. PAGE,
 CHAS. E. MIDICKEY.

Copies of this patent may be obtained for five cents each, by addressing the "Commissioner of Patents, Washington, D. C."